United States Patent [19]
Cooke et al.

[11] Patent Number: 5,420,955
[45] Date of Patent: May 30, 1995

[54] OPTICAL CABLES HAVING U-SHAPED CARRIERS EXHIBITING ENHANCED CRUSH PERFORMANCE

[75] Inventors: Harriet G. Cooke; Jeffrey L. Dellinger; Christopher K. Eoll, all of Hickory; Gregory A. Lochkovic, Newton, all of N.C.

[73] Assignee: Siecor Corporation, Hickory, N.C.

[21] Appl. No.: 264,209

[22] Filed: Jun. 22, 1994

[51] Int. Cl.⁶ .............................................. G02B 6/44
[52] U.S. Cl. ................................ 385/110; 385/105; 385/114
[58] Field of Search ............... 385/105, 106, 110, 112, 385/114

[56] References Cited

U.S. PATENT DOCUMENTS

| | | | |
|---|---|---|---|
| 4,235,511 | 11/1980 | Yonechi | 385/112 |
| 5,177,809 | 1/1993 | Zeidler | 385/105 |
| 5,210,813 | 5/1993 | Oestreich et al. | 385/105 |

FOREIGN PATENT DOCUMENTS

| | | | |
|---|---|---|---|
| 3839109 | 5/1990 | Germany . | |
| 54-106249 | 8/1979 | Japan | 385/110 |
| 56-19006 | 2/1981 | Japan | 385/110 |
| 61-282806 | 12/1986 | Japan | 385/105 |

OTHER PUBLICATIONS

"Preliminary Research into Ultra High Density and High Count Optical Fiber Cables," 1991 IWCS Proceedings pp. 8–15.

*Primary Examiner*—John D. Lee
*Attorney, Agent, or Firm*—J. David Abernethy

[57] ABSTRACT

A light waveguide cable contains a layer of U-shaped carriers around a central core. Each U-shaped carrier contains a light waveguide fiber, bundle, ribbon, or ribbon stack. Carrier legs have a predetermined hinge line at a distance from the carrier base greater than the thickness of the light waveguide fiber, bundle, ribbon or ribbon stack. The carrier legs may have a smaller thickness or a concavity at the hinge line.

21 Claims, 4 Drawing Sheets

OPTICAL CABLES HAVING U-SHAPED CARRIERS EXHIBITING ENHANCED CRUSH PERFORMANCE

BACKGROUND OF THE INVENTION

U-shaped carriers have been employed for use in light waveguide cables, particularly cables having light waveguide ribbons for high fiber count applications. The U-shaped carriers comprise two legs, each leg mounted at its proximal end to the same side of a base. The other end of each leg, called the distal end, usually supports an overlying binder tape or other cable layer. Each leg has an inner wall facing the other leg and an outer wall opposite the other leg.

Whereas a cable having U-shaped carriers has processing advantages over a slotted core cable, the demands of crush testing presents problems unique to cables employing U-shape carriers. Under stress, the carriers may tip over or the legs of a U-shaped carrier may deform or break. Carrier failure may lead to transmission failure of the light waveguide ribbons held therein. Depending on the exact mode of failure, the light waveguide ribbons may be twisted or crushed, leading to unacceptable attenuation. By way of example, carrier legs may break or bend at their proximal ends, that is, the ends joined to the carrier base. If this occurs, the ribbons are likely to be pressed upon by the folded leg (if the leg has folded inward toward the other leg of the carder) or by the overlying cable layer (if the leg has folded outward). An object of the invention is to design optical cables such that they will have crush failure modes which predictably will have the smallest effect on the ribbons held therein without sacrificing overall carrier strength.

SUMMARY OF THE INVENTION

The object of the invention is achieved by providing a predetermined hinge line in a carrier leg. As used herein, the term "hinge line" means a line about which a carrier leg will fold when subjected to enough stress to cause an irreversible destructive structural change in the carrier. When such stress is applied to a carrier according to the invention, the part of the carrier leg between the hinge line and the distal end folds, either inward or outward, about the hinge line. As the hinge line is at a distance from the carrier base greater than the thickness of the light waveguide ribbon, ribbon stack, light waveguide, or light waveguide bundle held within the carder, the remaining "stump" of the carrier leg between the carrier base and the hinge line still remains to provide a place of relative safety for the optical elements in the carder.

If the carrier holds a light waveguide ribbon or ribbons, the hinge line is located at a distance from the carrier base greater than the sum of the thicknesses of the ribbon unit or units. The thickness of a ribbon unit is the distance between the major surfaces of the ribbon unit. If the carrier holds a light waveguide or light waveguide bundle, the thickness of the waveguide or bundle is measured and the hinge line is located at a distance from the carrier base greater than that thickness. In either case, the light waveguide element or elements may still be contained in the carrier even if only the carder "stump" is left intact.

The carrier leg hinge line may be designed in several ways. One way is to make the leg thinner there, such that the leg is thicker at a point between the hinge line and the base and thicker at a point between the hinge line and the distal end of the leg. A concavity may be present in the leg at the hinge line. The leg may have a discontinuity at the hinge line. One such discontinuity is to make the leg of uniform thickness from the base to the hinge line, and then to make the leg tapering from wide to narrow from the distal end to the hinge line. This last arrangement seems ideal in many cases because the advantage of mode failure predictability is gained without sacrifice of any thickness in the leg between the hinge line and the base. Another approach is to provide a uniform carrier leg thickness between the base and the hinge line and then taper the leg to a smaller thickness at the distal end of the leg.

In many cases the ideal mode of failure is to have both carrier legs folding inwardly, providing a roof of sorts over the ribbons.

The variations in the shape of the carrier leg may in all cases be provided by shaping the carrier extrusion die in the manner desired.

DETAILED DESCRIPTION OF THE PREFERRED EMBODIMENTS

Figure 1:
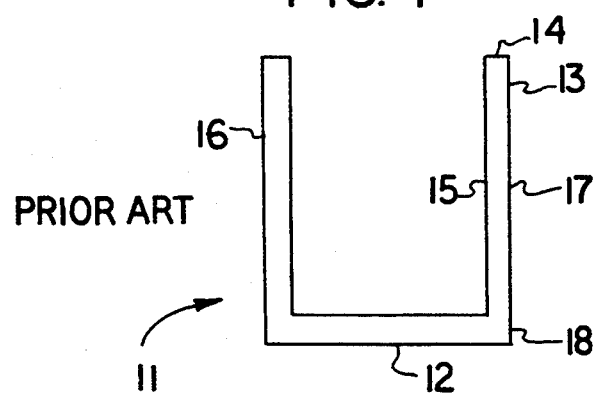
FIG. 1 is a cross sectional view of a prior an ribbon carder.

A prior art U-shaped carrier 11 is shown in FIG. 1. Carder 11 comprises a base 12 and legs 16, 17 mounted to the same side of base 12. Leg 17 has a proximal end 18 mounted to base 12 and a distal end 14. Leg 17 has an inner wall surface 15 facing leg 16 and an outer wall surface 13 opposite leg 16. Leg 16 has essentially the same features as leg 17.

Figure 2A:
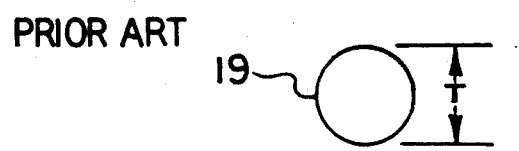
FIGS. 2A through 2C are cross sectional views of respectively a prior art light waveguide, a light waveguide bundle, and a light waveguide ribbon stack.
Figure 2B:
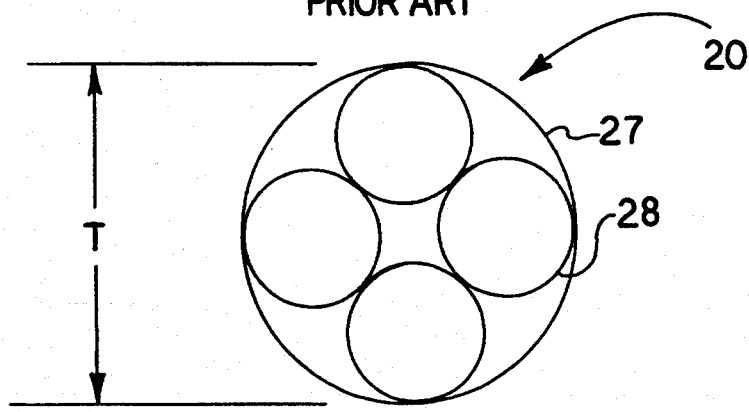
Figure 2C:
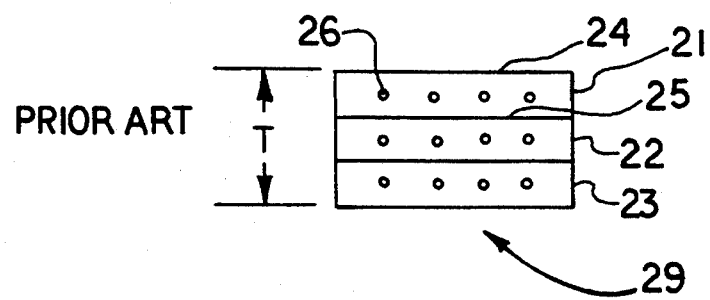

FIGS. 2, 2A, 2B show optical elements which may be placed in carrier 11. Light waveguide 19 shown in FIG. 2A has a thickness T. Light waveguide bundle 20 shown in FIG. 2B comprises a plurality of light waveguides 28 bound by a tube, thread, or tape 27. Shown in FIG. 2C is ribbon stack 29 of ribbons each having a plurality of fight waveguides 26 embedded in side-by-side relation in a material having a pair of major surfaces such as 24, 25 and a thickness 21, 22, or 23 between the major surfaces. Thickness 21 is less than the width of major surfaces 24 and 25. The thickness T of ribbon stack 29 is the sum of the thicknesses 21, 22, and 23. Any of elements 19, 20, or 29 may be placed in a carrier 11, and any of the carriers shown in FIGS. 3, 4, 5, 6, or 7 may contain any of elements 19, 20, or 29 therein.

Figure 3:
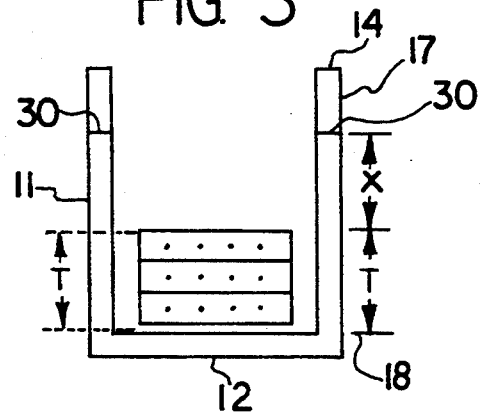
FIG. 3 is a schematic cross sectional view of a U-shaped carrier according to the invention holding a light waveguide ribbon stack.

Shown in FIG. 3 is carrier 11 containing a ribbon stack 29 having a thickness T. Carder leg 17 has a predetermined hinge line 30 located at a distance (T plus X) from carrier base 12, as measured from proximal end 18 even with the upper surface of base 12 facing ribbon stack 29. The formation of predetermined hinge line 30 is the subject of FIGS. 4–7.

Figure 4:
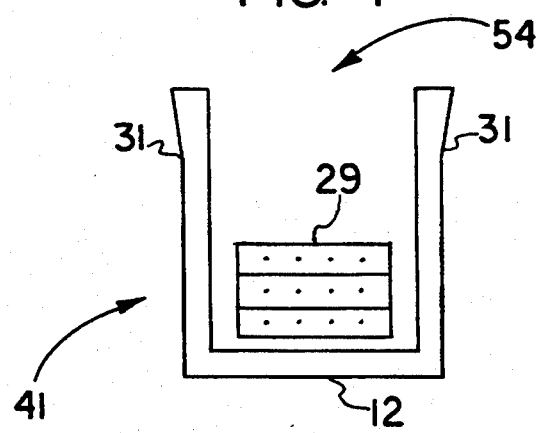
FIG. 4 is a cross sectional view of a U-shaped carrier according to the first preferred embodiment.

In the first preferred embodiment shown in FIG. 4, U-shaped carrier 54 has a base 12 and two legs each mounted at their proximal ends to base 12. Each leg tapers from wide to narrow from its distal end to the predetermined hinge line 31, at which hinge line 31 the outer wall surface of each leg changes direction. The portion of the outer wall surface above hinge line 31 is noncoplanar with the outer wall surface below hinge line 31. Each leg has a constant thickness from predetermined hinge line 31 to its proximal end. Hinge line 31 is at a distance from base 12 greater than the thickness of ribbon stack 29.

Figure 5:
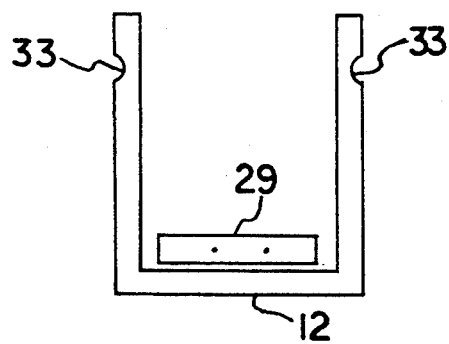
FIG. 5 is a cross sectional view of a U-shaped carrier according to the second preferred embodiment.

In the second preferred embodiment shown in FIG. 5, each leg of U-shaped carrier 55 has a concavity 33 at its predetermined hinge line in its outer wall surface. Concavity 33 is at a distance from base 12 greater than the thickness of ribbon stack 29. The depth of the concavity cannot be greater than a certain amount if the intent is to have the wall fold inward.

Figure 6:
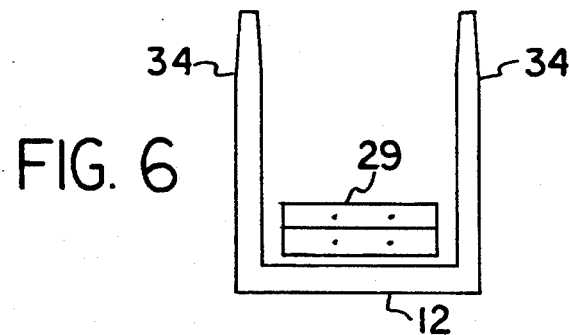
FIG. 6 is a cross sectional view of a U-shaped carrier according to the third preferred embodiment.

In the third preferred embodiment shown in FIG. 6, U-shaped carder 56 has base 12 and two legs each having a substantially uniform thickness from its proximal end to line 34 at a distance from base 12 greater than the thickness of ribbon stack 29, and each leg tapering in thickness from line 34 to its distal end. Line 34 is at a distance from base 12 greater than the thickness of ribbon stack 12.

Figure 7:
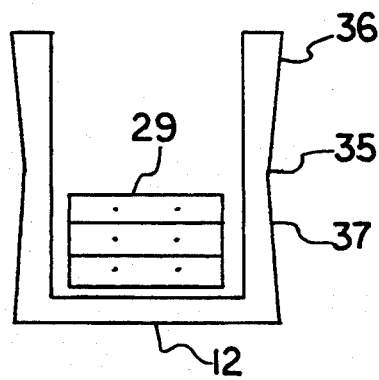
FIG. 7 is a cross sectional view of a U-shaped carrier according to the fourth preferred embodiment.

In the fourth preferred embodiment shown in FIG. 7, predetermined hinge line 35 is at a distance from base 12 greater than the thickness of ribbon stack 29. Each carrier leg has a thickness at line 35 which is less than its thickness at point 36 between line 35 and the distal end of the leg and which is also less than its thickness at point 37 between line 35 and base 12.

Combinations of the four preferred embodiments may be used. An example that works well in many cases is a combination of the first and second embodiments, which is the first embodiment shown in FIG. 4 with a slight concavity in the outer wall surface at the predetermined hinge line.

Figure 8:
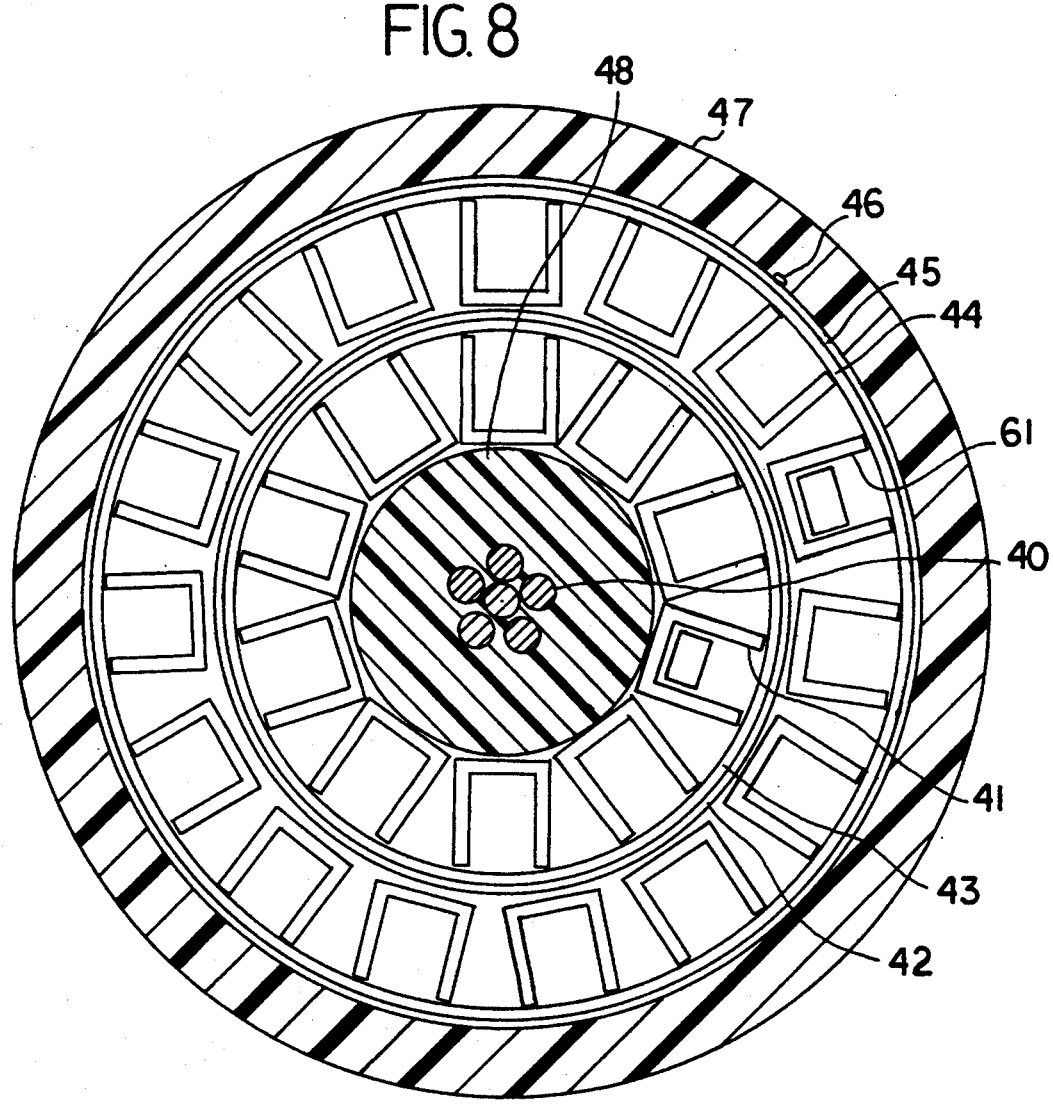
FIG. 8 is a cross sectional view of a fight waveguide cable according to the invention; and, FIG. 9 is a schematic view of a processing fine for making the U-shaped carriers according to the invention.

The cable as shown in FIG. 8 includes a central member 40 having a central twisted strength member core covered by a coating 48 of plastic. Central member 40 is covered by a first layer of U-shaped carriers 41 each holding a light waveguide, light waveguide bundle or light waveguide ribbon, a binder tape 42, a water blocking tape 43, a second layer of U-shaped carriers 61 each holding a light waveguide, light waveguide bundle or light waveguide ribbon, second binder tape 44, second water blocking tape 45, ripcord 46, and plastic jacket 47. Each of the U-shaped carriers in FIG. 8 may be made according to any of the embodiments of FIGS. 4–7.

Figure 9:
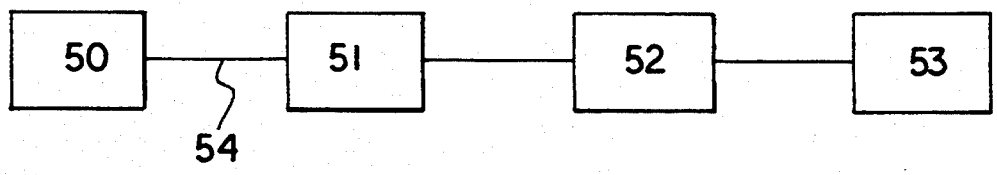

Referring to FIG. 9, a U-shaped carrier 54 as shown in any of the preferred embodiments is made by the Use of extruder 50 having a suitably shaped die. Carrier 54 proceeds from extruder 50 through cooling media 51. Carrier 54 is then pulled into turning unit 52, and Carrier 54 is then wound onto a drum 53. Carriers 54 may be made of any suitable plastic such as HDPE, amorphous nylon, polysulfone, polycarbonate, polyarylsulfone, or layers or copolymers of such plastics. It is helpful in some cases to orient the carrier legs downward, particularly if a water bath is used.

Methods for manufacture of a cable corresponding to the cable of FIG. 8 are disclosed in U.S. Pat. No. 5,210,813, assigned to Siemens AG, which patent is incorporated herein by reference. The cable can be manufactured by use of S–Z or rigid frame stranding.

What is claimed is:

1. A light waveguide cable having a longitudinal axis and comprising a light waveguide or light waveguide bundle having a first thickness received in a carrier having an approximately U-shaped cross section with two legs each mounted at its proximal end to the same side of a base; each carrier leg extending from the base radially outward from the longitudinal axis and having a predetermined hinge line at a distance from the carrier base greater than the first thickness.

2. A light waveguide cable as recited in claim 1, wherein a wall surface of at least one carrier leg has a concavity along its predetermined hinge line.

3. A light waveguide cable as recited in claim 1, wherein the predetermined hinge line of a carrier leg bounds two adjoining noncoplanar wall surfaces.

4. A light waveguide cable having a longitudinal axis and comprising a light waveguide or light waveguide bundle having a first thickness received in a carrier having an approximately U-shaped cross section with two legs each mounted at its proximal end to the same side of a base, each carrier leg extending from the base radially outward from the longitudinal axis and having a predetermined hinge line at a distance from the carrier base greater than the first thickness, at least one carrier leg having a thickness at the predetermined hinge line less than its thickness at a point between the predetermined hinge line and the base and less than its thickness at a point between the predetermined hinge line and its distal end.

5. A light waveguide cable having a longitudinal axis and comprising a light waveguide or light waveguide bundle having a first thickness received in a carrier having an approximately U-shaped cross section with two legs each mounted at its proximal end to the same side of a base, each carrier leg extending from the base radially outward from the longitudinal axis and having a predetermined hinge line at a distance from the carrier base greater than the first thickness, at least one carrier leg tapering from wide to narrow proceeding from the distal end of said at least one carrier leg to the predetermined hinge line and having a constant thickness from the predetermined hinge line to its proximal end.

6. A light waveguide cable having a longitudinal axis and comprising a carrier having an approximately U-shaped cross section with two legs each mounted at its proximal end to the same side of a base, the carrier holding at least one ribbon unit comprising a plurality of light waveguides held in side-by-side relation in a matrix material, said ribbon unit having a pair of major surfaces and a thickness between said major surfaces which is smaller than the width of the major surfaces; each carrier leg extending from the base radially outward from the longitudinal axis and having a predetermined hinge line at a distance from the carrier base greater than the sum of the thicknesses of the ribbon unit or units.

7. A light waveguide cable as recited in claim 6, wherein a wall surface of at least one carrier leg has a concavity along its predetermined hinge line.

8. A light waveguide cable as recited in claim 6, wherein the predetermined hinge line of a carrier leg bounds two adjoining noncoplanar wall surfaces.

9. A light waveguide cable having a longitudinal axis and comprising a carrier having an approximately U-shaped cross section with two legs each mounted at its proximal end to the same side of a base, the carrier holding at least one ribbon unit comprising a plurality of light waveguides held in side-by-side relation in a matrix material, said ribbon unit having a pair of major surfaces and a thickness between said major surfaces which is smaller than the width of the major surfaces; each carrier leg extending from the base radially outward from the longitudinal axis and having a predetermined hinge line at a distance from the carrier base greater than the sum of the thicknesses of the ribbon unit or units, at least one carrier leg having a thickness at the predetermined hinge line less than its thickness at a point between the predetermined hinge line and the base and less than its thickness at a point between the predetermined hinge line and its distal end.

10. A light waveguide cable having a longitudinal axis and comprising a carrier having an approximately U-shaped cross section with two legs each mounted at its proximal end to the same side of a base, the carrier holding at least one ribbon unit comprising a plurality of light waveguides held in side-by-side relation in a matrix material, said ribbon unit having a pair of major surfaces and a thickness between said major surfaces which is smaller than the width of the major surfaces; each carrier leg extending from the base radially outward from the longitudinal axis and having a predetermined hinge line at a distance from the carrier base greater than the sum of the thicknesses of the ribbon unit or units, at least one carrier leg tapering from wide to narrow proceeding from the distal end of said at least one carrier leg to the predetermined hinge line and having a constant thickness from the predetermined hinge line to its proximal end.

11. A light waveguide cable comprising a central core at least partially surrounded by a layer of components each having a light waveguide or a light waveguide bundle having a first thickness accepted in a carrier having an approximately U-shaped cross section with two legs each mounted at its proximal end to the same side of a base, each carrier leg extending from the base radially outward with respect to the central core and having a predetermined hinge line at a distance from the carrier base greater than the first thickness.

12. A light waveguide cable as recited in claim 11, at least one carrier leg having a thickness at the predetermined hinge line less than its thickness at a point between the predetermined hinge line and the base and less than its thickness at a point between the predetermined hinge line and its distal end.

13. A light waveguide cable as recited in claim 11, wherein a wall surface of at least one carrier leg has a concavity along its predetermined hinge line.

14. A light waveguide cable as recited in claim 11, wherein the predetermined hinge line of a carrier leg bounds two adjoining noncoplanar wall surfaces.

15. A light waveguide cable as recited in claim 11, wherein at least one carrier leg tapers from wide to narrow proceeding from the distal end of said at least one carrier leg to the predetermined hinge line and has a constant thickness from the predetermined hinge line to its proximal end.

16. A light waveguide cable comprising a central core at least partially surrounded by a layer of components each comprising a carrier having an approximately U-shaped cross section with two legs each mounted at its proximal end to the same side of a base, the carrier holding at least one ribbon unit comprising a plurality of light waveguides held in side-by-side relation in a matrix material, said ribbon unit having a pair of major surfaces and a thickness between said major surfaces which is smaller than the width of the major surfaces; each carrier leg extending from the base radially outward with respect to the central core and having a predetermined hinge line at a distance from the carrier base greater than the sum of the thickness of the ribbon unit or units.

17. A light waveguide cable as recited in claim 16, at least one carrier leg having a thickness at the predetermined hinge line less than its thickness at a point between the predetermined hinge line and the base and less than its thickness at a point between the predetermined hinge line and its distal end.

18. A light waveguide cable as recited in claim 16, wherein a wall surface of at least one carrier leg has a concavity along its predetermined hinge line.

19. A light waveguide cable as recited in claim 16, wherein the predetermined hinge line of a carrier leg bounds two adjoining noncoplanar wall surfaces.

20. A light waveguide cable as recited in claim 16, wherein at least one carrier leg tapers from wide to narrow proceeding from the distal end of said at least one carrier leg to the predetermined hinge line and has a constant thickness from the predetermined hinge line to its proximal end.

21. A light waveguide cable having a longitudinal axis and comprising a carrier having an approximately U-shaped cross section with two legs each mounted at its proximal end to the same side of a base, the carrier holding at least one ribbon unit comprising a plurality of light waveguides held in side-by-side relation in a matrix material, each ribbon unit having a pair of major surfaces and a thickness between said major surfaces which is smaller than the width of the major surfaces; each carder leg extending from the base radially outward with respect to the longitudinal axis and having a substantially uniform thickness from its proximal end to a line at a distance from the carrier base greater than the sum of the thicknesses of the ribbon unit or units, and each said carrier leg tapering in thickness from said line to its distal end.

* * * * *